June 1, 1971 R. A. DE LAP ET AL 3,582,455
LAMINATED SAFETY GLASS
Filed June 20, 1968
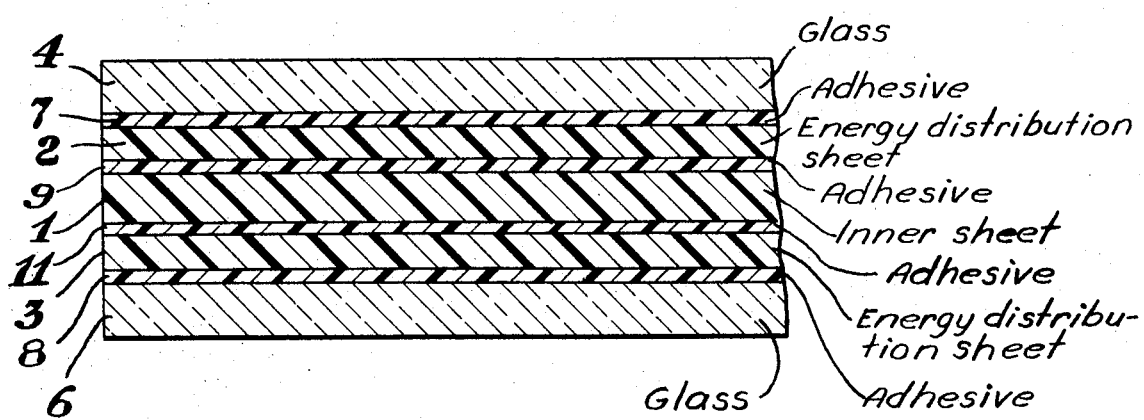
INVENTORS.
Robert A. DeLap
Frank P. Esch
BY
Ralph M Mellom
ATTORNEY

United States Patent Office

3,582,455
Patented June 1, 1971

---

3,582,455
LAMINATED SAFETY GLASS
Robert A. De Lap, Midland, and Frank P. Esch, Bay City, Mich., assignors to The Dow Chemical Company, Midland, Mich.
No Drawing. Filed June 20, 1968, Ser. No. 738,383
Int. Cl. B32b 17/10; C03c 27/12
U.S. Cl. 161—165
5 Claims

ABSTRACT OF THE DISCLOSURE

A laminated article comprising two sheets of glass and an inner sheet disposed therebetween of a substantially water insoluble alkyl ether of cellulose such as ethyl cellulose or an organic acid ester of cellulose such as cellulose acetate is prepared by applying an adhesive such as a latex of a copolymer of ethylene and acrylic acid to the mating surfaces of the inner sheet and the glass sheets and then bringing the sheets together and applying heat and pressure until a bond is formed between the several sheets. In an alternative embodiment, energy distribution sheets fabricated of, for example, an ionic copolymer are disposed between the inner sheet of ethyl cellulose or cellulose acetate and the glass sheets to improved the structural rigidity of the article.

---

This invention relates to laminated articles of glass. In one aspect, this invention relates to laminated safety glass including adhesive systems for bonding and holding the glass together. In another aspect, this invention relates to the inner layer or core of a laminated glass.

The art is replete with many types of safety glass laminates having an inner sheet of a resilient material disposed between two glass sheets. One popular construction includes an inner sheet of poly(vinyl butyral) between two glass sheets. This polymeric material offers a certain measure of protection in the event the glass sheets become fractured because it will tend to yield with the fractured glass and thereby aid in retaining fragments and splinters of glass. While such a construction has received rather widespread commercial acceptance over the years, increased demands on the quality of a safety glass including the structural properties have resulted in continued research efforts to improve these and other porperties of a safety glass. In this regard, efforts are continually being made to improve the load absorption and the load distribution properties of a safety glass laminate. Emphasis is also being placed upon the glass retention properties of a safety glass laminate after one or both of the glass facings of the laminate have been fractured.

According to this invention, many of the shortcomings of the prior art safety glass laminates are overcome and several advantages realized by a laminated product comprising at least two sheets of glass having disposed therebetween an inner sheet of a substantially water insoluble alkyl ether of cellulose. In a modification of the invention, the inner sheet is fabricated of an organic acid ester of cellulose. In a further modification of this embodiment of the invention, a substantially water insoluble adhesive is disposed between the sheets of glass and the inner sheet to provide a strong bond between the respective sheets.

In another embodiment of the invention, an energy distribution sheet is disposed between each of the sheets of glass and the inner sheet to further improve the load absorption and load distribution properties of the laminate. The energy distribution sheet is fabricated of material selected from the group consisting of copolymers of an α-olefin and an α,β-ethylenically unsaturated carboxylic acid; terpolymers of an α-olefin, an α,β-ethylenically unsaturated carboxylic acid, and a third monomer such as an alkyl ester of such an acid or a vinyl ester of a saturated carboxylic acid, and ionic copolymers of an α-olefin and an α,β-ethylenically unsaturated carboxylic acid wherein at least about 10 percent of the carboxylic acid groups are ionized by neutralization with metal ions. In a modification of this embodiment of the invention, a substantially water insoluble adhesive is disposed between each of the sheets of glass and each of the energy distribution sheets and also between each of the energy distribution sheets and the inner sheet.

In both embodiments of the invention enumerated, the water insoluble adhesive is selected from the group consisting of copolymers of an α-olefin and an α,β-ethylenically unsaturated carboxylic acid; terpolymers of an α-olefin, an α,β-ethylenically unsaturated carboxylic acid, and a third monomer such as an alkyl ester of an α,β-ethylenically unsaturated carboxylic acid or a vinyl ester of a saturated carboxylic acid; copolymers of styrene and butadiene; polyepoxide resins; polyester resins; or the like.

Accordingly, it is an object of this invention to improve the load absorption and the load distribution properties of a glass laminate.

Another object of this invention is to improve the glass retention properties of a glass laminate in the event the glass facings of the laminate become fractured.

A further object of this invention is to improve the load bearing capacity of a glass laminate.

Still another object of this invention is to provide a glass laminate which is resistant to delamination after the laminate has been fractured.

These and other objects of the invention will become apparent to one skilled in the art after studying the following detailed description, the accompanying drawing, and the appended claims.

As shown in the drawing, which is illustrative of a laminated product according to one embodiment of the invention, an inner sheet 1 fabricated of a substantially water insoluble alkyl ether of cellulose or of an organic acid ester of cellulose is disposed between energy distribution sheets 2 and 3. Glass sheets 4 and 6 are bonded to energy distribution sheets 2 and 3, respectively, by means of adhesive layers 7 and 8. The energy distribution sheets 2 and 3 are also bonded to the inner sheet 1 by means of adhesive layers 9 and 11.

The glass used in fabricating the safety glass laminate of this invention can be of any suitable type well known in the art such as, for example, plate glass, chemically tempered glass, or thermally tempered glass. The glass facings of the laminate can be of any suitable and convenient thickness such as, for example, between about 50 and about 250 mils. The size of the glass facings in terms of length and width can vary over wide limits and will depend upon the size of the final product and/or the size of the apparatus used to produce the laminated product.

The inner sheet which is disposed between the sheets of the glass facings in the laminated product is fabricated of a substantially water insoluble material selected from the group consisting of alkyl ethers of cellulose wherein each alkyl moiety of the ether has up to and including 7 carbon atoms per molecule and organic acid esters of cellulose wherein each organic acid moiety of the ester has up to and including 7 carbon atoms per molecule.

Exemplary alkyl ethers of cellulose which can be employed in the practice of this invention and which are within the scope of the above generic term include ethyl cellulose, propyl cellulose, butyl cellulose, pentyl cellulose, isopentyl cellulose, hexyl cellulose, heptyl cellulose, isoheptyl cellulose, and the like.

Exemplary organic acid esters of cellulose which can be used in the practice of this invention and which are within the scope of the above generic term include cellulose acetate, cellulose propionate, cellulose butyrate, cellulose caproate, cellulose caprylate, and the like. Mixtures of two or more organic acids can be employed in forming the esters of cellulose which are used in fabricating the inner sheet of the laminated product of this invention. Thus, esters within this classification which can be used in the practice of this invention include cellulose acetate butyrate, cellulose acetate propionate, cellulose acetate caprylate, and the like.

The inner sheet of the laminated product is of any suitable and convenient thickness. For example, the inner sheet can be of a thickness of at least about 15 mils with no maximum thickness except as that dictated by economics and fabrication techniques. Thus, for example, the inner layer can be of a thickness of between about 15 mils to about 1 inch or more.

The alkyl ethers of cellulose and the organic acid esters of cellulose useful in fabricating the inner sheet of the laminated product of this invention can be obtained commercially or they can be prepared by methods well known in the art. Suitable molding techniques can be employed for producing sheets of the cellulose ether or the cellulose acetate having the desired thickness and size.

The adhesive employed to bond the several sheets of the laminated article together is substantially water insoluble and is selected from the group consisting of copolymers of an α-olefin having up to and including 6 carbon atoms per molecule and an α,β-ethylenically unsaturated carboxylic acid having up to and including 8 carbon atoms per molecule; terpolymers of an α-olefin having up to and including 6 carbon atoms per molecule, an α,β-ethylenically unsaturated carboxylic acid having up to and including 8 carbon atoms per molecule, and a third monomer selected from the group consisting of alkyl esters of an α,β-ethylenically unsaturated carboxylic acid having up to and including 8 carbon atoms per molecule wherein the alkyl moiety of the ester contains up to and including 8 carbon atoms and vinyl esters of a saturated carboxylic acid having up to and including 8 carbon atoms per molecule; copolymers of styrene and butadiene; polyepoxide resins; and polyester resins.

Exemplary α-olefins which can be polymerized with an α,β-ethylenically unsaturated carboxylic acid to produce the copolymer adhesive or the terpolymer adhesive include ethylene, propylene, 1-butene, 1-pentene, methylpropene, 4-methyl-1-pentene, and the like. The adhesive can be the random copolymer formed by copolymerizing the α-olefin with the α,β-ethylenically unsaturated carboxylic acid or it can be a graft copolymer obtained by grafting the α,β-ethylenically unsaturated carboxylic acid onto a suitable polyolefin.

Exemplary α,β-ethylenically unsaturated carboxylic acids which can be copolymerized with the α-olefin or grafted onto the polyolefin to produce the copolymer adhesive or the terpolymer adhesive include acrylic, methacrylic, ethacrylic, crotonic, isocrotonic, tiglic, angelic, senecioic, hexenic, teracrylic, and the like.

Exemplary other monomers which can be copolymerized with the α-olefin and the α,β-ethylenically unsaturated carboxylic acid to produce the terpolymer adhesive useful in the invention include alkyl esters of an α,β-ethylenically unsaturated carboxylic acid such as, for example, methyl methacrylate, ethyl methacrylate, methyl ethacrylate, methyl angelate, ethyl senecioate, and the like. In a modification of this embodiment of the invention, the terpolymer adhesive can have as a third monomer in addition to the α-olefin and the α,β-ethylenically unsaturated carboxylic acid a vinyl ester of a saturated carboxylic acid having up to and including 8 carbon atoms per molecule. Exemplary vinyl esters of such acids include vinyl acetate, vinyl propionate, vinyl butyrate, vinyl caprylate, and the like.

The adhesive containing the α,β-ethylenically unsaturated carboxylic acid acid can have any suitable amount of combined acid such as, for example, between about 0.5 and about 25 percent by weight α,β-ethylenically unsaturated carboxylic acid of the type described, up to about 39.5 percent by weight combined ester of an acid of the type described, and between about 60 and about 99.5 percent by weight combined α-olefin. Thus, the adhesive can be, for example, a copolymer containing 99.5 percent by weight olefin and 0.5 percent by weight acid: a copolymer containing 75 percent by weight olefin and 25 percent by weight acid; a terpolymer containing 60 percent by weight olefin, 39.5 percent by weight ester of an acid, and 0.5 percent by weight acid; a terpolymer containing 60 percent by weight olefin, 15 percent by weight ester of an acid, and 25 percent by weight acid; and a terpolymer containing 80 percent by weight olefin, 12 percent by weight ester of an acid, and 8 percent by weight acid.

The copolymer and terpolymer adhesive systems outlined above can be obtained commercially or they can be prepared by processes well known in the art. Although the invention is not to be limited or bound by any particular technique for preparing the adhesive copolymer or terpolymer, graft copolymers suitable for use as an adhesive in the practice of this invention can be prepared by the methods outlined in U.S. Pats. 3,177,269 and 3,270,090, the disclosures of which are specifically incorporated herein by reference. A suitable technique for preparing the terpolymer adhesive useful in practicing the invention is outlined in U.S. Pat. 3,249,570, the disclosure of which is likewise specifically incorporated herein by reference.

Other exemplary adhesives which can be used to produce a laminated product according to this invention include copolymers of styrene and butadiene, suitable polyepoxide resins, or polyester resins such as, for example, polyethylene terephthalate and the like. Many suitable polyepoxide resins useful in the practice of the invention and the technique for their preparation can be had by reference to a book entitled "Handbook of Epoxy Resins" by Lee and Neville published in 1967 by The McGraw-Hill Book Company the disclosure of which is specifically incorporated herein by reference.

In a modification of the invention, it is generally preferred to employ a coupling agent in the adhesive system to augment the effectiveness of the adhesive and thereby form still a better bond between the several sheets of the laminated product to further improve the load absorption and the load distribution properties of the product. The coupling agent is any suitable epoxy organo silane which is compatible with the adhesive and which aids in improving the bond between the several sheets of the laminated article. Exemplary coupling agents which can be used in the practice of this invention are disclosed in U.S. Pats. 2,946,701 and 3,317,369, the disclosures of which are specifically incorporated herein by reference. Specific exemplary epoxy organo silane coupling agents which can be used include 3-(trimethoxy silyl) propyl glycidyl ether; 3-(triethoxy silyl) propyl glycidyl ether; 2-(trimethoxy silyl) ethyl glycidyl ether; 4-(trimethoxy silyl) butyl glycidyl ether; and the like.

Although the amount of the epoxy organo silane coupling agent employed is largely a matter of personal choice dictated primarily by economics, concentrations of between about 0.1 and about 2 percent by weight coupling agent based upon the total weight of the adhesive system can be used. It is evident that concentrations outside of this range can be employed if desired.

The thickness of the several adhesive layers in the laminated product can be the same or different and each layer can be between, for example, about 0.1 and about 2 mils thick. Adhesive layers having thicknesses outside of this range can be used if desired.

In another embodiment of the invention, an energy distribution sheet is disposed between each of the sheets of glass and the inner sheet such that the adhesive is disposed between each of the sheets of glass and each of the energy distribution sheets and between each of the energy distribution sheets and the inner sheet. The energy distribution sheet aids in further improving the structural qualities of the laminated product in terms of load absorption and load distribution.

The energy distribution sheet is fabricated of a copolymer of an α-olefin having up to and including 6 carbon atoms per molecule and an α,β-ethylenically unsaturated carboxylic acid having up to and including 8 carbon atoms per molecule. Exemplary α-olefins which can be copolymerized with an α,β-ethylenically unsaturated carboxylic acid include ethylene, propylene, butene, pentene, methyl pentene, hexene, and the like. Exemplary α,β-ethylenically unsaturated carboxylic acids which can be copolymerized with the α-olefin include acrylic, methacrylic, ethacrylic, crotonic, isocrotonic, tiglic, angelic, senecioic, and the like. The copolymer used in fabricating the energy distribution sheet can be a random copolymer or a graft copolymer prepared by the same techniques described in connection with the preparation of the adhesive systems of this invention. In general, the copolymer is molded to provide an energy distribution sheet of the desired size, shape, and thickness.

In a modification of the invention, the energy distribution sheet can be fabricated of a terpolymer of an α-olefin having up to and including six carbon atoms per molecule, an α,β-ethylenically unsaturated carboxylic acid having up to and including 8 carbon atoms per molecule, and a third monomer selected from a group consisting of alkyl esters of an α,β-ethylenically unsaturated carboxylic acid having up to and including 8 carbon atoms wherein the alkyl moiety of the ester contains up to and including 8 carbon atoms and vinyl esters of a saturated carboxylic acid having up to and including 8 carbon atoms per molecule. This terpolymer is the same as the terpolymer adhesive employed in bonding the laminated sheets together. The specific exemplary α-olefins, the α,β-ethylenically unsaturated carboxylic acids, the alkyl esters of an α,β-ethylenically unsaturated carboxylic acid, and the vinyl esters of a saturated carboxylic acid described in connection with the adhesive are also exemplary monomers which can be copolymerized to form a terpolymer which can be used to fabricate the energy distribution sheet. In general, the energy distribution sheet can be formed by molding beads of the terpolymer under suitable conditions of temperature and pressure to provide a sheet having the desired size and thickness.

In that embodiment of the invention which includes an energy distribution sheet fabricated of a material containing an α,β-ethylenically unsaturated carboxylic acid of the type described, the material can have any suitable amount of combined acid such as, for example, between about 0.5 and about 25 percent by weight α,β-ethylenically unsaturated carboxylic acid of the type described, up to about 39.5 percent by weight combined ester of an acid of the type described, and between about 60 and about 99.5 percent by weight combined α-olefin. Thus, the energy distribution sheet can be fabricated of, for example, a copolymer containing 99.5 percent by weight olefin and 0.5 percent by weight acid; a copolymer containing 75 percent by weight olefin and 25 percent by weight acid; terpolymer containing 60 percent by weight olefin, 39.5 percent by weight ester of an acid, and 0.5 percent by weight acid; a terpolymer containing 60 percent by weight olefin, 15 percent by weight ester of an acid, and 25 percent by weight acid; and a terpolymer containing 80 percent by weight olefin, 12 percent by weight ester of an acid and 8 percent by weight acid.

In yet another modification of the invention the energy distribution sheet can be fabricated of an ionic copolymer of an α-olefin having up to and including 6 carbon atoms per molecule and an α,β-ethylenically unsaturated carboxylic acid selected from the group consisting of mono- carboxylic acids and dicarboxylic acids each having up to and including 8 carbon atoms per molecule wherein at least about 10 percent of the carboxylic acid groups of the copolymer have been ionized by neutralization with suitable metal ions. In this modification of the invention, exemplary α-olefins and α,β-ethylenically unsaturated carboxylic acids which can be used in forming the ionic copolymer are the same as those employed and specified in connection with the preparation of the adhesive system of the invention. Exemplary metals which can be used to neutralize the carboxylic acid groups in the copolymer include suitable metals in Groups I-A, I-B, II-A, II-B, III-A, III-B, IV-A, and VIII identified in the Periodic Table of the Elements published by E. H. Sargent & Co. under catalog No. S-18806. The ionic copolymer useful in fabricating the energy distribution sheet of this invention can be prepared by any suitable technique well known in the art. One technique for producing the ionic copolymer is described in U.S. Pat. 3,338,739 the disclosure of which is specifically incorporated herein by reference. The ionic copolymer is molded under suitable conditions of temperature and pressure to produce an energy distribution sheet of the desired size and thickness.

Exemplary monovalent and divalent metal ions which can be used to neutralize the carboxylic acid groups include sodium, potassium, lithium, cesium, silver, mercury, copper, beryllium, magnesium, calcium, strontium, barium, cadmium, tin, lead, iron, cobalt, nickel, zinc, aluminum, and the like.

The energy distribution sheets are preferably substantially transparent, have good load distribution properties, and good thermal expansion properties in that they will adjust to radical changes in temperature. The energy distribution sheets should have a modulus of less than about 100,000 p.s.i. such as between about 20,000 and 100,000 p.s.i. and preferably less than about 60,000 p.s.i. The energy distribution sheets can be of any suitable thickness such as, for example, between about 10 and about 30 mils.

Although ranges of thickness have been recited for the glass facings, the inner sheet, the energy distribution sheets, and the adhesive layers, such ranges are intended to be exemplary only and should not be construed as limiting of the invention.

The laminated product of this invention can be fabricated by any of a variety of suitable techniques well known in the art. Although the invention is not to be bound by any particular technique for producing the laminated product, one suitable technique involves applying the adhesive in the form of a latex to one surface of each of two glass sheets. The adhesive is also applied to both surfaces of an inner sheet of the type herein described. The inner sheet is then positioned between the adhesive-coated surfaces of the glass sheets to form a composite which is then placed in a press and subjected to elevated temperatures and pressures until a strong bond is formed. In that embodiment of the invention wherein energy distribution sheets are disposed between the glass sheets and the inner sheet, the latex adhesive is applied to both surfaces of the energy distribution sheets before they are disposed between the adhesive-coated glass sheets and the adhesive-coated inner sheet. This composite including the glass sheets, the energy distribution sheets, and the inner sheet is then placed in a press and subjected to elevated temperatures and pressures until a strong bond is formed.

The adhesive can be applied to the surfaces of the various sheets by any suitable technique well known in the art such as, for example, solution deposition, dip coating, electrostatic deposition, and the like.

The laminated articles of this invention have utility in a variety of different environments including industrial applications such as, for example, factories, warehouses, manufacturing plants, and the like; commercial applications such as, for example, retail stores, high-rise apartment buildings, theaters, sports event stadiums, and the like; home applications such as, for example, family dwellings, out buildings, and the like; and land, air, and water vehicle applications such as, for example, airplanes, space vehicles, submarines, ships, automobiles, trucks, busses, and the like.

The following examples will illustrate the improvements in the load absorption and the load distribution properties of a glass laminate fabricated according to the teachings of the invention. It is to be understood that these examples are for the purpose of illustration only and are not intended to be limiting of the invention.

EXAMPLES 1–12

In a series of runs to illustrate the improvement in the load bearing properties of a laminate having an inner sheet of ethyl cellulose, several laminated articles were prepared and tested and the results compared with a laminate having an inner sheet fabricated of poly(vinyl butyral) instead of the ethyl cellulose. The several glass laminates were prepared by coating a latex of a terpolymer of 14 weight percent combined acrylic acid, 14 weight percent ethyl acrylate, and 72 weight percent ethylene on one surface of each of two glass sheets measuring about 12 inches square and on both surfaces of a rigid sheet of ethyl cellulose of about the same size. The terpolymer latex contained about 1 percent by weight 3-(trimethoxy silyl) propyl glycidyl ether coupling agent. The adhesive was applied in an amount to provide a coating of about 1 mil thick. Sheets of an ionic copolymer containing about 90 percent by weight combined methacrylic acid having about 33 percent of the carboxylic acid groups neutralized with sodium ions were placed between the inner sheet and the glass sheets. The ionic copolymer sheets had a thickness of about 25 mils. The composite was then placed in a press and subjected to a pressure of about 100 p.s.i. at a temperature of about 250° F. for a period of time sufficient to produce the laminate. The same technique was followed and the same materials used in preparing the control laminated articles having poly-(vinyl butyral) as the inner sheet.

The several laminates were tested to determine their respective load bearing properties by dropping a 5 pound steel ball from a height of 12 feet such that the ball struck the laminate at its approximate center. The laminates were supported on a frame around their periphery. The impact caused both sheets of glass to fracture but in all cases the glass fragments remained adhered to the adhesive within the laminated product. The fractured laminated articles were then placed on edge and subjected to a load on their edge until they buckled. This property is representative of the load adsorption and the load distribution properties of a glass laminate after the glass sheets have been fractured. Table I below reflects the results of these runs.

TABLE I

| | Inner sheet thickness (mils) | Glass sheets | | Maximum load to buckle (lbs.) |
|---|---|---|---|---|
| | | Type | Thickness (mils) | |
| Control: | | | | |
| 1 | 30 | Plate | 120 | 17 |
| 2 | 80 | do | 120 | 15 |
| Run: | | | | |
| 1 | 65 | do | 90 | 3,650 |
| 2 | 75 | do | 90 | 6,170 |
| 3 | 100 | do | 90 | 8,300 |
| 4 | 130 | do | 90 | 7,450 |
| 5 | 65 | do | 120 | 850 |
| 6 | 75 | do | 120 | 7,150 |
| 7 | 100 | do | 120 | 14,300 |
| 8 | 130 | do | 120 | 10,100 |
| 9 | 65 | Chemcor [1] | 85 | 450 |
| 10 | 75 | do | 85 | 490 |
| 11 | 100 | do | 85 | 725 |
| 12 | 130 | do | 85 | 2,350 |

[1] Chemcor—Chemically tempered glass made by Corning Glass Works.

Control runs 1 and 2 employed an inner sheet of poly-(vinyl butyral). Runs 1 through 12 employed an inner sheet of ethyl cellulose.

It is evident from the data reported in Table I that the load bearing properties of a glass laminate having a core of ethyl cellulose are greatly improved as compared to a glass laminate having a core of poly(vinyl butyral).

Although the invention has been described in considerable detail, it must be understood that such description is for the purpose of illustration only and is not to be considered limiting of the invention.

That which is claimed is:

1. A laminated product comprising:
 (A) at least two sheets of glass;
 (B) an inner sheet disposed between said sheets of glass fabricated of a substantially water insoluble material selected from the group consisting of alkyl ethers of cellulose wherein each alkyl moiety of said ether has up to and including 7 carbon atoms and organic acid esters of cellulose wherein each organic acid moiety of said ester has up to and including 7 carbon atoms;
 (C) an energy distribution sheet disposed between each of said sheets of glass and said inner sheet fabricated of a material selected from the group consisting of:
  (a) a copolymer of an α-olefin having up to and including 6 carbon atoms per molecule and an α,β-ethylenically unsaturated carboxylic acid having up to and including 8 carbon atoms per molecule;
  (b) a terpolymer of an α-olefin having up to and including 6 carbon atoms per molecule, an α,β-ethylenically unsaturated carboxylic acid having up to and including 8 carbon atoms per molecule, and a third monomer selected from the group consisting of:
   an alkyl ester of an α,β-ethylenically unsaturated carboxylic acid having up to and including 8 carbon atoms wherein the alkyl moiety of said ester contains up to and including 8 carbon atoms and
   a vinyl ester of a saturated carboxylic acid having up to and including 8 carbon atoms per molecule; and
  (c) an ionic copolymer of an α-olefin having up to and including 6 carbon atoms per molecule and an α,β-ethylenically unsaturated carboxylic acid selected from the group consisting of monocarboxylic acids and dicarboxylic acids each having up to and including 8 carbon atoms per molecule, said ionic copolymer having at least about 10 percent of the carboxylic groups ionized by neutralization with metal ions; and
 (D) a substantially water insoluble adhesive disposed between each of said sheets of glass and each of said energy distribution sheets and between each of said energy distribution sheets and said inner sheet.

2. A laminated product according to claim 1 wherein:
 (a) each of said sheets of glass has a thickness of between about 50 and about 250 mils,
 (b) each of said energy distribution sheets has a thickness of between about 10 and about 30 mils,
 (c) each of said adhesives has a thickness of between about 0.1 and about 2 mils, and
 (d) said inner sheet has a thickness of at least about 15 mils.

3. A laminated product according to claim 1 wherein:
 (a) each of said sheets of glass is plate glass;
 (b) each of said energy distribution sheets is fabricated from an ionic copolymer of ethylene and methacrylic acid wherein about 33 percent of the carboxylic acid groups are neutralized with sodium ions;
 (c) said adhesive is a latex of a terpolymer of ethylene, acrylic acid, and ethyl acrylate containing about 1 percent by weight 3-(trimethoxy silyl)propyl glycidyl ether; and
 (d) said inner sheet is fabricated from ethyl cellulose.

4. A laminated product according to claim 1 wherein said water insoluble adhesive is selected from the group consisting of:
  (a) a copolymer of an α-olefin having up to and including 6 carbon atoms per molecule and an α,β-ethylenically unsaturated carboxylic acid having up to and including 8 carbon atoms per molecule;
  (b) a terpolymer of an α-olefin having up to and including 6 carbon atoms per molecule, and α,β-ethylenically unsaturated carboxylic acid having up to and including 8 carbon atoms per molecule, and a third monomer selected from the group consisting of:
    an alkyl ester of an α,β-ethylenically unsaturated carboxylic acid having up to and including 8 carbon atoms wherein the alkyl moiety of said ester contains up to and including 8 carbon atoms and
    a vinyl ester of a saturated carboxylic acid having up to and including 8 carbon atoms per molecule;
  (c) a copolymer of styrene and butadiene;
  (d) polyepoxide resins; and
  (e) polyester resins.

5. A laminated product according to claim 4 wherein said water insoluble adhesive is in the form of a latex containing up to about 2 weight percent of an epoxy organo silane coupling agent.

References Cited
UNITED STATES PATENTS

| | | | |
|---|---|---|---|
| 2,003,288 | 6/1935 | Fix et al. | 161—193 |
| 2,289,792 | 7/1942 | Malm et al. | 156—106 |
| 3,157,563 | 11/1964 | Baum | 161—204 |
| 3,285,802 | 11/1966 | Smith et al. | 161—185 |
| 3,297,186 | 1/1967 | Wells | 161—185X |
| 3,344,014 | 9/1968 | Rees | 161—203 |
| 3,437,517 | 4/1969 | Eilerman | 161—185X |
| 3,475,267 | 10/1969 | Miles | 161—203 |

HAROLD ANSHER, Primary Examiner

U.S. Cl. X.R.

156—106; 161—185, 193, 195, 203, 204, 209, 249